Nov. 12, 1929.　　　　M. CURRY　　　　1,735,601
VEHICLE
Filed May 12, 1926　　　3 Sheets-Sheet 1

Inventor,
Manfred Curry.
By William C. Linton.
Attorney.

Nov. 12, 1929.　　　　M. CURRY　　　　1,735,601
VEHICLE
Filed May 12, 1926　　3 Sheets-Sheet 2
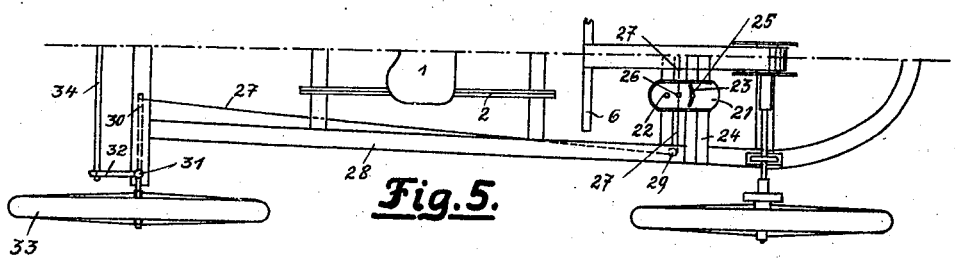
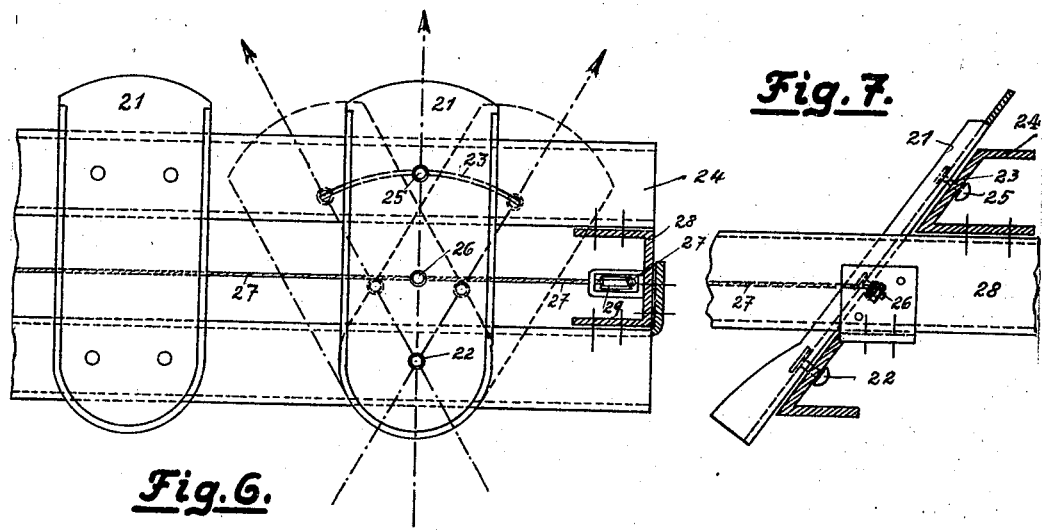
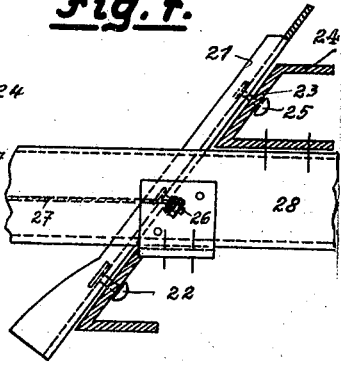
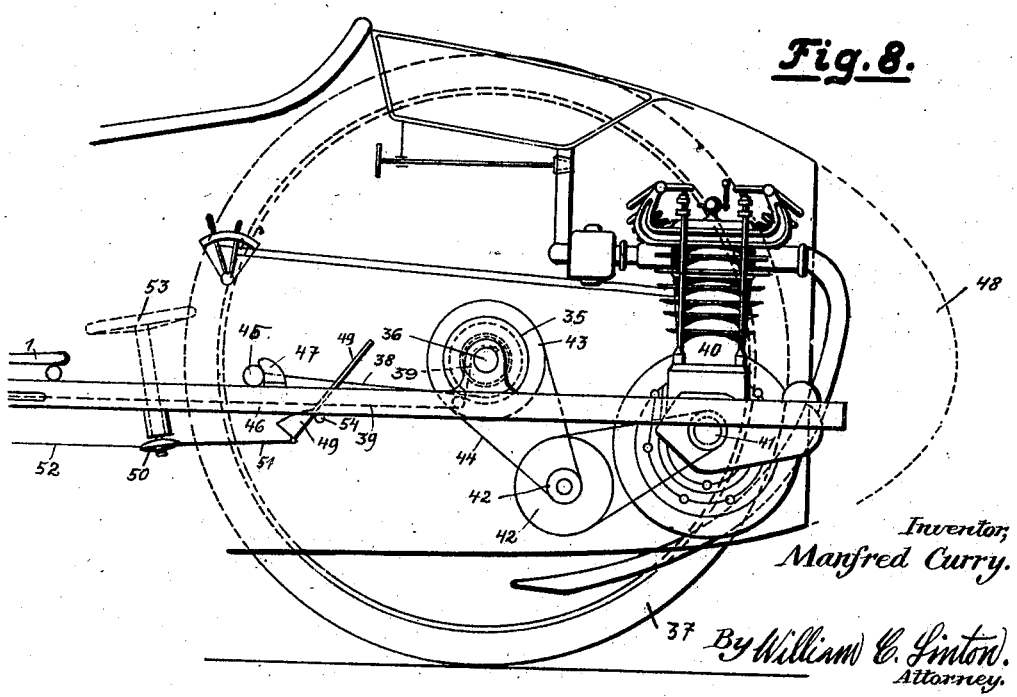
Inventor;
Manfred Curry.
By William C. Linton.
Attorney.

Nov. 12, 1929.                  M. CURRY                   1,735,601
                                VEHICLE
                          Filed May 12, 1926          3 Sheets-Sheet  3

Inventor
Manfred Curry
By Attorney
Mayer, Warfield & Watson

Patented Nov. 12, 1929

1,735,601

UNITED STATES PATENT OFFICE

MANFRED CURRY, OF MUNICH, GERMANY, ASSIGNOR TO CURRY LANDSKIFF CORPORATION, OF NEW YORK, N. Y., A CORPORATION OF NEW YORK

VEHICLE

Application filed May 12, 1926, Serial No. 108,679, and in Germany January 4, 1926.

The invention relates to a vehicle which is propelled through rowing motions. There are vehicles known which are propelled through the legs or the motion of the arms. Vehicles which are propelled through the arms are so-called invalid-chairs and in the main toys known under the name of "Dutchman" (children's toy). Utilization of the human power in propelling these vehicles is attained in an imperfect measure only. The most perfect utilization of the same can be observed on rowing-boats. The human strength which is applied to the above-mentioned rowing-boats consists of three power units: the most powerful force, the strength of the upper thigh; the strength of the abdominal muscles produced by the to and fro swinging of the body; and, thirdly, the strength of the arm-muscles exercised through drawing-in and stretching-out the arms. The strength of the legs can be utilized by placing the feet against a fixed point and shifting the body together with the seat, using for that purpose the so-called gliding or roller seat. In case the roller seat is in its most backward position, the strength of the abdominal muscles will be exercised through the leaning back of the body to which is added, while the body is in a rigid position, the strength of the arm-muscles by getting them closer to the shoulders. In order to utilize these three powers as well as possible, the direction of the pulling force of the means of transmission must about coincide to the longitudinal axis of the body in the lying or sitting position. A vehicle utilizing the human strength in this way is able to propel much larger masses, or respectively, to develop a higher speed than the vehicles previously known and propelled by human force. The toys must be excluded here from the very beginning, because they do not utilize the strength according to the above-mentioned directions and because they have not been constructed to guarantee this utilization of power on an economical basis. Special difficulties were encountered with the steering becoming quite sensitive on vehicles with steering device on the hind-wheels. The invention in question shows such a steering device in different forms of construction.

A further perfection of the rowing vehicle according to the invention in question consists in the fact that an auxiliary motor may be built-in, fixing of this auxiliary motor being extremely simple. In this way the driver may start the motor by simply pulling the belt after he has been driving quite a way, in the case of grades, etc., being of great assistance to the work of the rower. The invention in question is shown in the accompanying drawing representing some examples of the form of construction:

Fig. 1 represents a side elevation of a rowing vehicle with hind-wheel drive and front-wheel steering;

Fig. 2 a plan of Fig. 1;

Fig. 3 a rowing vehicle having front wheel drive and hind-wheel steering in side elevation;

Fig. 4 a plan of such a rowing vehicle;

Fig. 5 a plan of a rowing vehicle, that is the arrangement of the hind-wheel steering;

Fig. 6 a detail of the steering device in front elevation;

Fig. 7 a side elevation of Fig. 6;

Fig. 8 an arrangement in case an auxiliary motor is built-in;

Figure 1:
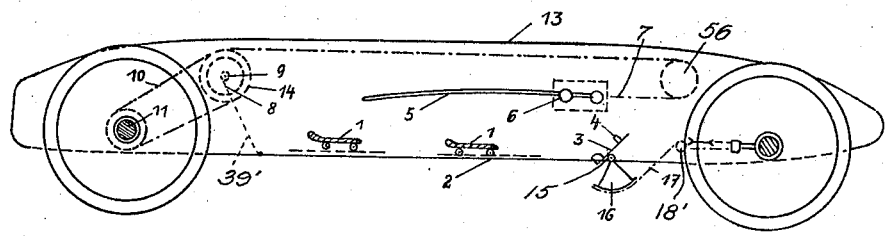

The vehicle may be constructed with two, three, four and more wheels. The example here shows a four wheel vehicle whose four wheels are arranged similar to the arrangement on motor car trucks. Driving can be effected on the rear axle as well as on the front-wheels. The front wheels can be turned for steering for which purpose both the guide steering and the bogie steering may be used. So many persons may be placed in this vehicle as is desirable, according to the chosen size and dimensions. The steering device may be operated either by the driver himself through a foot lever or the like or by a person having no part in the driving, the assistant-driver, as in the case of racing boats. For the persons propelling the vehicle, there are provided seats 1, which can be moved to and fro on rails 2 (so-called roller-seats). The feet are pressed by the rider against a suitable foot rest such as the foot-levers 3 or the bar 3', and are held thereon, by suitable means, such as a frame 4. The hands grasp a bar 6 which is movable longitudinally of the vehicle. The motion of the vehicle is effected by reciprocation of the bar 6, there being provided connecting means between the bar and the driving wheels. This connecting means includes free-wheel mechanism and is arranged to convert the reciprocating movement of the bar 6 into unidirectional rotative movement of the wheels for the propulsion of the vehicle. In the exemplification shown in Figs. 1 and 2, a pair of cables or wire ropes 7 extend respectively from the bar 6 about a pair of sheaves 56 and thence to a pair of drums 14 upon which they are adapted to be wound. From a drum 58 carried on the shaft 9, a chain drive 10 extends to a drum 59 mounted on the rear axle of the vehicle. Free wheel mechanism 8 is provided, to the end that the drive 10 will be operated only in response to the unwinding of the cables 7 from the drums 14. Speed-changing mechanism may be provided in this connection, if desired. Driving can furthermore be effected directly on the rear axle without intermediate shaft 9, simply according to the arrangement of the hull 13. In the drives 8 which are provided with so-called free wheel reversible mechanism a spring acts to wind the ropes 7 on the driving drum 14 after the ropes have run off these drums so that the driving bar 6 is returned to its original position. For example, there may be employed an elastic strand 39' which will roll up spirally on the shaft 9 and be tightened when the tractive means 7 are pulled off.

Figure 11:
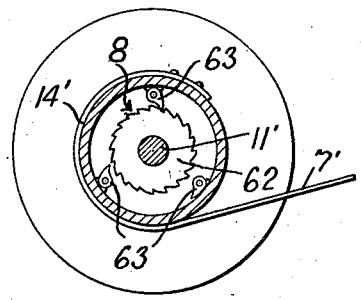
Fig. 11 is a sectional view taken through the drum and illustrating one form of free-wheel mechanism.

In the exemplification shown in Figs. 3, 4, 9 and 10 two bars 6 are provided and are connected by means of cables or ropes 60. From the forward one of the bars 6, a belt or strap 7' extends to a drum 14' which is mounted on the forward axle 11' of the vehicle and is connected thereto by free-wheel reversible mechanism. A spring acts to wind a belt 7' on the drum 14' after the belt has been unwound therefrom. There may be employed in connection with any vehicle constructed in accordance with the invention, any suitable type of free-wheel mechanism, or any suitable arrangement of the spring; such, for example, as the arrangement shown in the Courtney Patent No. 348,619, or an arrangement such as shown in Fig. 11, which illustrates particularly mechanism suitable for use in connection with the vehicle disclosed in Figs. 3 and 4 and Figs. 9 and 10. In Fig. 11 there is shown the hollow drum 14' rotatably mounted on the axle 11' but prevented from rotating thereon in one direction by means of an annular ratchet 62, formed on the axle within the drum and cooperating pawls 63 attached to the drum. A sleeve extends to one side of the drum about the axle, and there is attached to this sleeve and wound thereon a rope or cable 64 to the free end of which a spring 65 is secured, the free end of the spring being attached to a portion 66 of the frame of the vehicle. Alternatively, there may be employed an elastic rope, such as exemplified in connection with the exemplification shown in Fig. 8.

As heretofore brought out, the vehicle may be constructed to hold one or more persons, and any number of these may participate in the driving. In the exemplification shown in Figs. 1 to 4 and Figs. 9 and 10 the foot rests provided for the forward driver are in the nature of foot levers 3; suitable stationary foot rests 3' being provided for the other driver.

Figure 2:
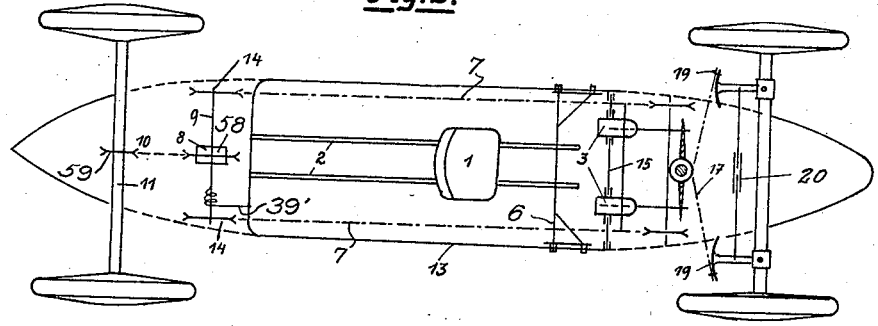
Figure 3:
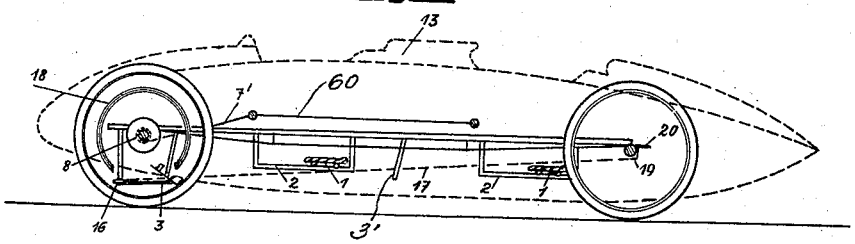
Figure 4:
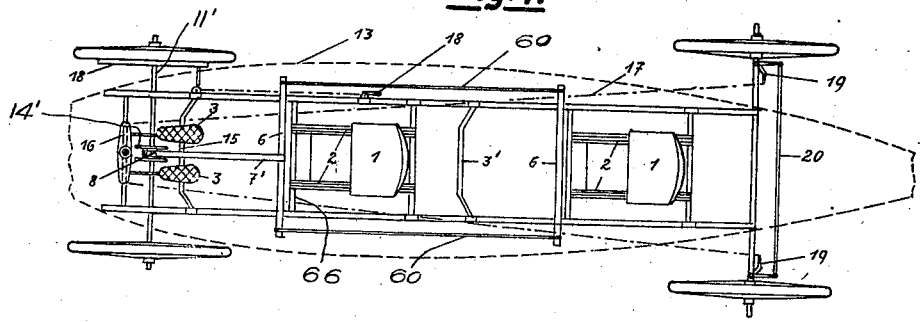
Figure 9:
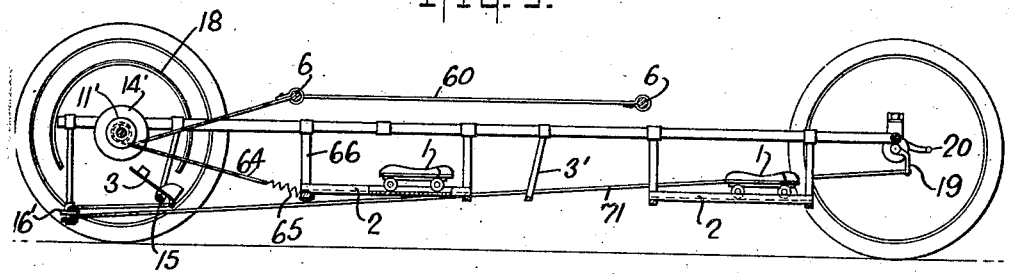
Fig. 9 is an enlarged vertical section through the machine illustrated in Figs. 3 and 4, showing the same in greater detail.
Figure 10:
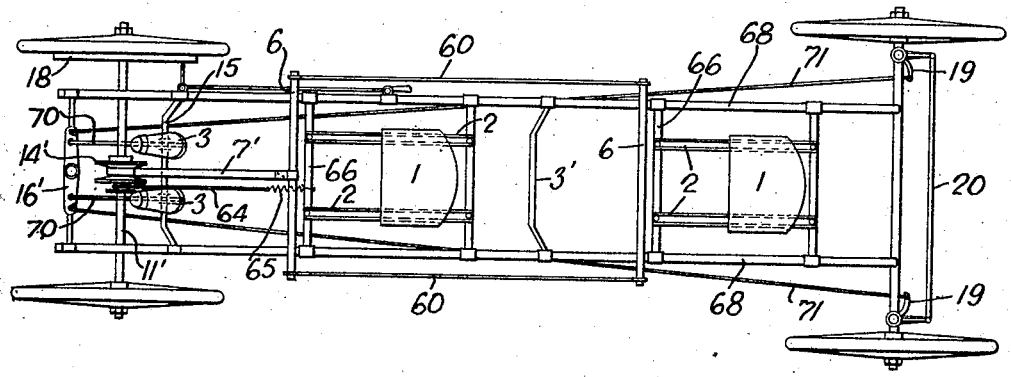
Fig. 10 is an enlarged top view of this machine.

The foot levers 3 are arranged on the foot-lever shaft 15 independently of each other and pivot on the shaft. In Figs. 1 and 2, the levers are exemplified as provided with segments 16, from which ropes 17 lead to the steering mechanism of the vehicle. In Figs. 3, 4, 9 and 10 there is exemplified a vehicle wherein the levers 3, which are pivoted intermediate their ends on the shaft 15, are each pivotally connected at its lower or rear end with a link 70 extending to one arm of a centrally pivoted lever 16' from either arm of which there extend ropes 71 to the bell-crank lever 19 of the steering mechanism on the rear wheels. The vehicle may also be equipped with brakes, in order to stop it quickly in case of too high a speed. Operation of a vehicle of this kind is done in the following way: The driver seats himself on the roller-seat 1, places his feet into the frame 4 of the foot lever 3, and takes hold of the bar 6 with his hands. Now in forcing his body backwards by pressing against the foot levers through the strength of the muscles of his legs the roller-seat will move backwards, so that the driver retracts the bar 6 at the same time. While his body is in its hindmost position, the upper part of the body is moved backwards and the bar 6 is also pulled still more backwards, and the bending of the arms will now allow a further retraction of the bar 6. It will be apparent that these movements may be made simultaneously, instead of successively. After these three possibilities have been gone through, the body has to be erected again, which is easily done by pulling against the frame 4 on the foot-lever and the bar will return into its starting position through the influence of the spring associated with the reversible drive 8. The propulsion of the vehicle is accomplished by pulling the tractive element, or elements such as the ropes 7 or the belt 7' off their respective drums through successive and long strokes. In case there is no assistant driver a motion of the tip of the foot on the foot lever is sufficient for steering to cause a turning of the front wheels or, the rear wheels, as the case may be. The foot levers are provided with segments from which ropes are passing over rollers 18' to the bell crank lever 19 on one lever arm of which a wheel is mounted. In the exemplification shown in Figs. 1 and 2, the other lever arms of the bell crank levers 19 are made in shape of a segment in order that the ropes may get hold in every position. To produce a constrained motion of both wheels the bell crank levers are provided with a connecting rod 20 which may be adjustable (see Fig. 2) so that the splay of the wheels can be changed at any time.

The steering device shown in Figs. 5, 6, 7 is described as follows. The feet of the driver rest on the pedals 21 against which the driver presses in pulling off the tractive means. One or both pedals may be mounted so as to be turned around a point 22 by turning the foot resting on the pedal. A guiding device consisting of a slot 23 in the cross connecting bar 24 and a flat headed screw 25 with nut will assure a safe gliding of the upper half of the pedal on the cross connecting bar 24 avoiding in this way a lifting off of the pedal 21. It will be apparent that in the exemplified arrangement the pedal pivots on an axis perpendicular to the pressure surface of the pedal. The latter is rigidly connected at a point 26 to a rope 27 passing across the longitudinal axis of the vehicle, the point 26 being any desirable distance above the lower end of pedal 21. This rope 27 is led over small wheels 29, which are connected to the longitudinal beams 28 and provided with strings, to the steering swivels 30 which are rigidly connected to the pivots 31 of the wheels 33 which are effecting the steering. In case of shifting the foot resting on the steering pedal, this motion will be transmitted through the rope 27 to the steering swivels 30 and by this to the steering wheels 33. In a vertical direction to the above mentioned steering swivels 30 two more steering swivels 32 are connected with the pivots 31. These steering swivels again are connected by means of a bar 34 which on the ends is mounted on articulated seats. This device assures a constrained turning of both steering wheels.

In case the rowing vehicle is loaded more than is usual, the steering pressure also is increased, and in this case, if both pedals are pivotally mounted, steering may be effected through the action of both feet simultaneously instead of by the action of one foot only, as has been described before. When such an arrangement is employed, one or the other of the two feet of the driver may be taken off the pedal as the driver desires in order to allow one foot to rest if the latter is not required. This kind of arrangement is especially suited to drivers who have hurt their legs and who according to the degree of their injury can work the steering at one time with one leg, at another time with the other. The present disclosure represents a solution of the old problem of constructing a vehicle which will require the same movements of the operator as is required of a person rowing in a row boat, the device therefore serving for training rowers on land.

In many cases it will be suitable to equip the rowing vehicle with an auxiliary power in order to continue the run when the human force has weakened or some greater obstacles must be surmounted. Such an arrangement is exemplified in the embodiment of the invention shown in Fig. 8, wherein the drum 35, which is mounted free wheel-like on the driving shaft 36, is connected to two driving wheels 37 also constructed with free wheel mechanism. Whenever a tractive means 38 rolled up on the drum 35 in a spiral form, in this example a leather belt, will be pulled off, the vehicle will be started to move. A detachable elastic strand or rope 39, which will roll up on the shaft 36 spirally and be tightened when the tractive means 38 are pulled off, will effect the rolling up again of the tractive means through its elastic force. In the frame section in front a motor 40 has been fixed to assist in the driving by human power or wholly to replace it.

The rotating motion of the motor shaft 41 may be transmitted to wheel 43, firmly connected to the driving shaft 36 by means of a simple intermediate drive 42. Starting of the motor is effected by putting on the transmitting means 44, a belt, chain or the like, and pulling off the tractive means 38. The vehicle may be constructed so that when the motor starts, the driver is free to assist the motor in the driving, or he may leave the driving to the motor alone. In the latter case the driver places the beam 45 connected to the tractive means 38 upon the frame 46, where it is held in a position by noses 47 which position will allow the beam to be grasped by the driver most easily any time it is desired. At the same time the noses 47 prevent the entire rolling up of the tractive means 38. The necessary hand levers, etc., of the motor may be arranged in any desired way. The motor may be exposed to enough air for cooling purposes by taking off the cap of the body 48. Steering of the vehicle is effected through a (vertical) shifting of the pedals 49 with the aid of the legs for which the pedals will serve at the same time as counter-boards when pulling. The transmission of the deviation of the pedals to the steering wheels by ropes 52 is effected through a two armed lever 50 which is connected to the pedals 49 by means of rods 51. In case the motor is working alone, the operator may use his hands for steering the vehicle by placing them upon the reserve steering wheel 53, provided with a foot extending into the center point of the steering lever 50 which is provided with a holding device. When the motor is propelling the vehicle and the driver is steering the vehicle by means of the hand-steering wheel 53, he may remove his feet from the pedals and place them on the foot rest 54 at the side of the pedals.

Having now particularly described and ascertained the nature of my invention and in what manner the same is to be performed, I declare that what I claim is:—

1. In a vehicle, including wheels and a frame, the combination of a rotatable element, a tractive element attached to the rotatable element and adapted to be wound thereon, means tending to wind said tractive element on said rotatable element, a seat carried by said frame, the relative position of said seat and said rotatable element being such that when the free end of said tractive element is pulled by a rider resting on said seat the tractive element will extend directly from the rotatable element to the rider and will be unwound from the rotatable element, and means for connecting said rotatable element to at least one of said wheels, said connecting means being arranged to cause a rotation of said wheels in one direction for the propulsion of the vehicle in response to the unwinding of said tractive element but to permit said wheel or wheels to rotate freely in said direction during the winding of said tractive element.

2. In a vehicle, including wheels and a frame, the combination of a rotatable element, a tractive element attached to the rotatable element and adapted to be wound thereon, means tending to wind said tractive element on said rotatable element, a seat carried by said frame in a position substantially as low as said rotatable element and arranged to permit a rider resting thereon to exert a direct pull on said tractive element for unwinding the same from the rotatable element and rotating the rotatable element, and means for connecting said rotatable element to at least one of said wheels, said connecting means being arranged to cause a rotation of said wheel or wheels in one direction for the propulsion of the vehicle in response to the unwinding of said tractive element but to permit said wheel or wheels to rotate freely in said direction during the winding of said tractive element.

3. In a vehicle, including wheels and a frame, the combination of a rotatable element, a tractive element attached to the rotatable element and adapted to be wound thereon by the action of a spring, a seat mounted on said frame for longitudinal movement in a horizontal plane substantially as low as the axis of said rotatable element, means providing a foot rest for the rider to permit the rider to reciprocate said seat and to retract said tractive element to unwind the same, and means for connecting said rotatable element to one or more of said wheels, said connecting means being arranged to cause a rotation of said wheel or wheels in one direction for the propulsion of the vehicle in response to the unwinding of said tractive element and to permit said wheel or wheels to rotate freely in said direction during the winding of said tractive element.

4. In a vehicle, including wheels and a frame, the combination of a driving shaft, connecting means between said shaft and a pair of said wheels, said connecting means including free-wheel mechanism, a seat mounted on said frame for longitudinal movement in a plane substantially as low as said shaft, a handle adapted to be grasped by a rider resting on said seat, a tractive element extending from said handle to said shaft, and means including said free-wheel mechanism and said shaft to convert intermittent retractions of said tractive element to unidirectional movement of said wheels for the propulsion of the vehicle.

5. In a vehicle, including wheels and a frame, a forward axle connected to a pair of said wheels, a drum mounted on said axle, a tractive element attached to and adapted to be wound on said drum, a seat mounted on said frame for longitudinal movement, said seat being positioned to permit a rider riding thereon to unwind the tractive element by pulling the same in a direction substantially tangential to said drum, means providing a foot rest for the rider, means including said axle and said drum to convert intermittent retractions of said handle into unidirectional rotative movement of said pair of wheels.

6. In a vehicle, including wheels and a frame, a forward axle connected to at least one of said wheels, a drum mounted on said axle, connections between said axle to cause a rotation of said axle with said drum in one direction and to permit said drum to rotate freely upon said axle in the other direction, a tractive element attached to and adapted to be wound on said drum, means tending to rotate said drum in said other direction and to wind said tractive element thereon, a longitudinally movable seat carried by said frame behind said axle, foot rests for a rider resting on said seat, said parts being arranged to permit said rider to apply to the unwinding of said tractive element power derived from a rowing motion involving leg, arm and abdominal muscles.

7. In a vehicle, including wheels and a frame, the combination of a rotatable element, a tractive element attached to the rotatable element and adapted to be wound thereon, a handle attached to the free end of said tractive element, means tending to wind said tractive element on said rotatable element, a seat carried by said frame, said seat and said tractive element being so mounted that a rider resting on said seat can unwind said tractive element by a movement of said handle directly away from said rotatable element in a substantially horizontal direction, and means for connecting said rotatable element to at least one of said wheels, said connecting means being arranged to cause a rotation of said wheel or wheels in one direction for the propulsion of the vehicle in response to the unwinding of said tractive element but to permit said wheel or wheels to rotate freely in said direction during the winding of said tractive element.

8. In a vehicle, including wheels and a frame, the combination of a forward axle connecting a pair of said wheels, a drum mounted on said axle, means to connect said drum and said axle whereby said drum will rotate said axle therewith in one direction and will rotate freely upon said axle in the other direction, a belt attached to and adapted to be wound on said drum upon rotation of the drum in said other direction, means tending to wind said belt on said drum, a seat mounted on said frame for movement longitudinally of said vehicle, the relative positions of said seat and said drum being such as to permit a rider resting on said seat to unwind said belt from said drum by pulling the same away from said drum in a substantially horizontal direction.

9. In a vehicle, including wheels and a frame, the combination of a rotatable element, a tractive element attached to said rotatable element and adapted to be wound thereon, a seat mounted on said frame for longitudinal movement, a pair of foot rests each mounted on said frame to serve as a counterboard to permit a rider with his foot thereon intermittently to retract said tractive element, at least one of said foot rests being pivotally mounted, means for imparting movement to at least one of said wheels in response to pivotal movement of said one of said foot rests, and means including said rotatable element to convert intermittent retractions of said tractive element into unidirectional rotation of at least one other of said wheels.

10. In a vehicle, including wheels and a frame, the combination of a rotatable element, a tractive element attached to said rotatable element and adapted to be wound thereon, a seat mounted on said frame for longitudinal movement, a pair of foot rests each mounted on said frame to serve as a counter-board to permit a rider with his foot thereon intermittently to retract said tractive element, at least one of said foot rests being mounted for pivotal movement on an axis perpendicular to the pressure surface thereof, means for imparting a steering movement to at least one of said wheels in response to pivotal movement of said one of said foot rests, and means including said rotatable element to convert intermittent retractions of said tractive element into unidirectional rotation of at least one other of said wheels.

11. In a vehicle, including wheels and a frame, the combination of an internal combustion engine, a longitudinally movable seat for a rider, a rotatable element, a tractive element attached to the rotatable element and adapted to be wound thereon, means including said seat, said tractive element and said rotatable element, to utilize power derived from movements of the leg, arm and abdominal muscles of the rider in the unwinding of said tractive element, and means for connecting said rotatable element and said engine, said connecting means being arranged to apply for starting said engine rotative movement of said rotatable element responsive to the unwinding of said tractive element.

12. In a vehicle adapted to be propelled by a rowing motion of the rider, a forward axle, a free wheel mechanism on said axle, a seat for the rider, said seat being mounted for movement in a plane substantially as low as said axle, a tractive element extending from said free wheel mechanism and adapted to be grasped by a rider resting on said seat and to extend directly from said free wheel mechanism to said rider, whereby a rowing motion of said rider utilizing the leg, arm and abdominal muscles will be applied without loss of power to said free wheel mechanism to rotate said forward axle.

In witness whereof I have hereunto set my hand.

MANFRED CURRY.